United States Patent
Yang et al.

(10) Patent No.: US 10,953,762 B2
(45) Date of Patent: *Mar. 23, 2021

(54) PILOT SIGNAL DETECTION AND INDICATION UNIT AND ELECTRIC VEHICLE CHARGING SYSTEM INCLUDING THE SAME

(71) Applicant: EATON INTELLIGENT POWER LIMITED, Dublin (IE)

(72) Inventors: Andrew Yang, Shanghai (CN); Tom Xiong, Shanghai (CN); Jerry Zhang, Shanghai (CN); Lily Du, Shanghai (CN); Harry Zhang, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,988

(22) Filed: Apr. 22, 2020

(65) Prior Publication Data

US 2020/0247259 A1 Aug. 6, 2020

Related U.S. Application Data

(63) Continuation of application No. 15/384,510, filed on Dec. 20, 2016, now Pat. No. 10,661,673.

(51) Int. Cl.
*B60L 53/16* (2019.01)
*B60L 53/31* (2019.01)
(Continued)

(52) U.S. Cl.
CPC ............... *B60L 53/16* (2019.02); *B60L 53/18* (2019.02); *B60L 53/305* (2019.02); *B60L 53/31* (2019.02);
(Continued)

(58) Field of Classification Search
CPC .......... B60L 53/16; B60L 53/60; B60L 53/62; B60L 53/31; B60L 53/18; B60L 53/305;
(Continued)

(56) References Cited

U.S. PATENT DOCUMENTS

| 10,661,673 B2 * | 5/2020 | Yang ..................... B60L 53/18 |
| 2011/0193532 A1 * | 8/2011 | Iwanaga ............... B60W 20/13 |
| | | 320/163 |

(Continued)

*Primary Examiner* — Richard Isla
*Assistant Examiner* — Johali A Torres Ruiz
(74) *Attorney, Agent, or Firm* — Eckert Seamans Cherin & Mellott, LLC

(57) ABSTRACT

A pilot signal detection and indication unit includes a pilot signal scaling unit structured to generate a scaled pilot signal by shifting a pilot signal using a bias voltage and scaling down the pilot signal, a pilot signal duty cycle comparator unit structured to generate a limited pilot signal that has a fixed peak voltage and a duty cycle that is equivalent to the duty cycle of the pilot signal, a processing unit structured to determine a voltage value and the duty cycle value of the pilot signal from the scaled pilot signal and the limited pilot signal, and to generate an indication signal based on the determined voltage value and duty cycle value, and an indication unit having a number of indicators and being structured to activate selected ones of the number of indicators based on the indication signal.

21 Claims, 5 Drawing Sheets

(51) Int. Cl.
 *B60L 53/18* (2019.01)
 *B60L 53/30* (2019.01)
 *B60L 53/62* (2019.01)
 *B60L 53/60* (2019.01)

(52) U.S. Cl.
 CPC ............... *B60L 53/60* (2019.02); *B60L 53/62* (2019.02); *Y02T 10/70* (2013.01); *Y02T 10/7072* (2013.01); *Y02T 90/16* (2013.01)

(58) Field of Classification Search
 CPC ..... Y02T 10/70; Y02T 10/7072; Y02T 90/12; Y02T 90/14; Y02T 90/16
 See application file for complete search history.

(56) References Cited

U.S. PATENT DOCUMENTS

2014/0117752 A1* 5/2014 Flack .................... H03J 1/0008
 307/9.1
2016/0261127 A1 9/2016 Worry
2017/0334301 A1 11/2017 Wu \* cited by examiner

PILOT SIGNAL DETECTION AND INDICATION UNIT AND ELECTRIC VEHICLE CHARGING SYSTEM INCLUDING THE SAME

CROSS-REFERENCE TO RELATED APPLICATION

This application is a continuation of, and claims priority from, U.S. patent application Ser. No. 15/384,510, filed Dec. 20, 2016, entitled "PILOT SIGNAL DETECTION AND INDICATION UNIT AND ELECTRIC VEHICLE CHARGING SYSTEM INCLUDING THE SAME", the contents of which are incorporated herein by reference.

BACKGROUND

Field

The disclosed concept pertains generally to electric vehicle charging and, more particularly, to a pilot signal detection and indication unit for use with an electric vehicle charging system.

Background Information

An electric vehicle (EV) charging station, also called an EV charging station, electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands.

An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle.

EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin 3, one control pilot pin 4, and one proximity pin 5), the EVSE to EV handshake over the pilot pin 4, and how both parts (EVSE and EV) are supposed to function. FIG. 1 is a block diagram in schematic form of a charging system 100 compliant with the J1772 standard.

Two-way communication seeks to ensure that the current passed to the EV is both below the limits of the EV charging station itself and below the limits of what the EV can receive. There are additional safety features, such as a safety lock-out that does not allow current to flow from the EV charging station until the EV connector or EV plug is physically inserted into the EV and the EV is ready to accept energy.

J1772 in North America and IEC 61851 standard use a very simple but effective pilot circuit and handshake in the EVSE. For charging a vehicle using alternating current (AC), the control electronics 22 generate a 12V pilot signal. The 12V pilot signal is provided to the pilot pin 4 of FIG. 1. When the EVSE cable and connector 10 is plugged into an EV inlet 11 of a compliant vehicle 12, the vehicle's circuit has a resistor 14 and a diode 16 in series that ties to ground 18 in order to drop the 12V to 9 V. After the EVSE 20 sees this drop in voltage, it turns on a pulse-width modulated (PWM) generator in control electronics 22 that defines the maximum available line current (ALC) on the charging circuit. The vehicle charge controller 24 reads the percentage of the duty cycle of the PWM signal, which is equivalent to a certain amperage, and sets the maximum current draw on the onboard vehicle rectifier/charger 26, in order to not trip an upstream circuit interrupter (not shown). The vehicle 12, in turn, adds another resistor 28 in parallel with the resistor 14 of the vehicle's resistor and diode 14,16 series combination, which then drops the top level of the PWM pilot signal to 6V. This tells the EVSE 20 that the vehicle 12 is ready to charge. In response, the EVSE 20 closes an internal relay/contactor 30 to allow AC power to flow to the vehicle 12.

The contactor 30 includes a first set of contacts 32 and a second set of contacts 34. The EVSE 20 includes a first differential amplifier circuit 40 that is electrically connected to a line side output of the first set of contacts 32 via a first connection 44 and to a load side output of the first set of contacts 32 via a second connection 46. The EVSE 20 also includes a second differential amplifier circuit 42 that is electrically connected to a line side output of the second set of contacts 34 via a third connection 48 and to a load side output of the second set of contacts 34 via a fourth connection 50. The first differential amplifier circuit 40 amplifies a difference in voltage between the line side output and the load side output of the first set of contacts 32 and the second differential amplifier circuit 42 amplifies a difference in voltage between the line side output and the load side output of the second set of contacts 34 and outputs the amplified voltage differences to the control electronics 22.

The control electronics 22 determine, from the amplified voltage differences received from the first and second differential amplifier circuits 40,42, whether the first and/or second sets of contacts 32,34 are open or closed. For example, when there is little or no difference in the voltages between the line and load side outputs of one of the set of contacts 32,34, it is an indication that the set of contacts is closed.

The voltage and duty cycle of the pilot signal provide information on the status and charging capacity of the EVSE 20 and EV 12. This information could be helpful to a user of the system 100. However, the system 100 does not provide the information to a user of the system 100.

There is room for improvement in EVSE to EV charging systems including, for example, circuitry for detection a pilot signal and providing an indication based on the voltage and frequency of the pilot signal.

SUMMARY

These needs and others are met by embodiments of the disclosed concept in which a pilot signal detection and indication unit detects the voltage and duty cycle of a pilot signal and provides an indication signal based on the detected voltage and duty cycle.

In accordance with aspects of the disclosed concept, an electrical circuit for use with an electric vehicle charging system having a pilot signal with a voltage value and a duty cycle, comprises: a bias voltage unit structured to generate a bias voltage using a supply voltage; a pilot signal scaling unit structured to generate a scaled pilot signal by shifting the pilot signal using the bias voltage and scaling down the pilot signal; a pilot signal duty cycle comparator unit structured to generate a limited pilot signal that has a fixed peak voltage and a duty cycle that is equivalent to the duty cycle of the pilot signal; a processing unit structured to determine a voltage value and the duty cycle value of the pilot signal from the scaled pilot signal and the limited pilot signal, and to generate an indication signal based on the determined voltage value and duty cycle value; and an indication unit having a number of indicators and being structured to activate selected ones of the number of indicators based on the indication signal.

In accordance with other aspects of the disclosed concept, an electric vehicle charging system comprises: an electric vehicle; electric vehicle supply equipment structured to provide power to charge the electric vehicle and to generate a pilot signal having a voltage value and a duty cycle value; and a connector structured to electrically connect the electric vehicle supply equipment to the electric vehicle, the connector including a pilot detection and indication circuit. The pilot signal detection and indication unit comprises: a bias voltage unit structured to generate a bias voltage using a supply voltage; a pilot signal scaling unit structured to generate a scaled pilot signal by shifting the pilot signal using the bias voltage and scaling down the pilot signal; a pilot signal duty cycle comparator unit structured to generate a limited pilot signal that has a fixed peak voltage and a duty cycle that is equivalent to the duty cycle of the pilot signal; a processing unit structured to determine a voltage value and the duty cycle value of the pilot signal from the scaled pilot signal and the limited pilot signal, and to generate an indication signal based on the determined voltage value and duty cycle value; and an indication unit having a number of indicators and being structured to activate selected ones of the number of indicators based on the indication signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Electric vehicle charging systems compliant with the J1772 standard use a pilot signal that can range in voltage between −12V and 12V. The pilot signal is a 1 kHz square wave having a duty cycle. J1772 provides for various statuses associated with the voltage of a pilot signal.

TABLE 1

| Base Status | Charging Status | Voltage |
| --- | --- | --- |
| Status A | Standby | +12 V |
| Status B | Vehicle Detected | +9 ± 1 V |
| Status C | Ready (charging) | +6 ± 1 V |
| Status D | With ventilation | +3 ± 1 V |
| Status E | No power (shut off) | 0 V |
| Status F | Error | −12 V |

For example, in the standby status (e.g., the EV connector is not plugged into an EV), the pilot signal will have a voltage of 12V. Once the EV connector is plugged into the EV, but is not charging the EV, the voltage of the pilot signal will change to 9±1V. Voltages of the pilot signal are also associated with statuses of with ventilation (i.e., the EV requests charging be done in a ventilated area), no power, and error, as shown in Table 1.

J1771 also provides for various charging capacities based on the duty cycle of the pilot signal.

TABLE 2

| PWM | SAE Continuous | SAE Short Term |
| --- | --- | --- |
| 50% | 30 A | 36 A peak |
| 40% | 24 A | 30 A peak |
| 30% | 18 A | 22 A peak |
| 25% | 15 A | 20 A peak |
| 16% | 9.6 A | |
| 10% | 6 A | |

For example, if the pilot signal has a duty cycle of 50%, it indicates that the EVSE is able to provide a maximum of a 30 A current to continuously charge the EV or to provide a 36 A peak current in the short term, as shown in Table 2.

Figure 1:
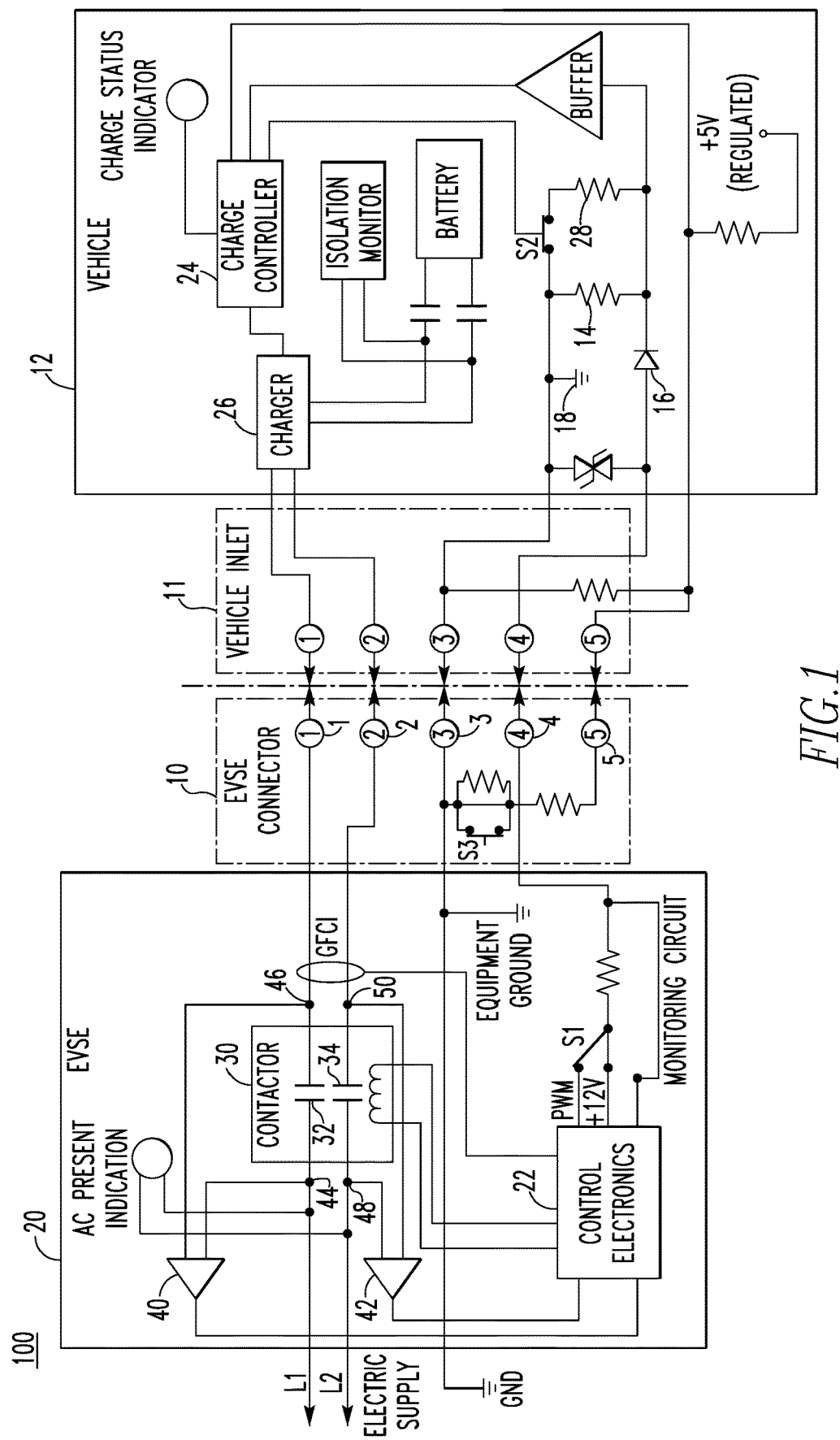
FIG. 1 is a block diagram in schematic form of an electric vehicle charging system.
Figure 2:
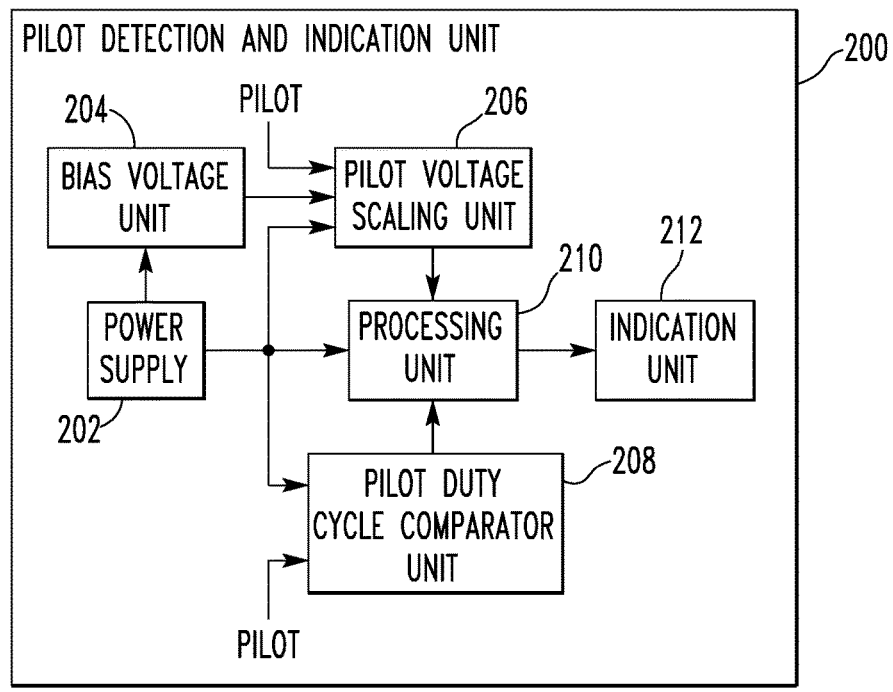
FIG. 2 is a block diagram in schematic form of a pilot signal detection and indication unit in accordance with an example embodiment of the disclosed concept.

FIG. 2 is a block diagram in schematic form of a pilot signal detection and indication unit 200 in accordance with an example embodiment of the disclosed concept. The pilot signal detection and indication unit 200 is structured to detect the voltage value and duty cycle of a pilot signal used in an electric vehicle charging system (such as the electric vehicle charging system 100 of FIG. 1 or the electric vehicle charging system 100' of FIG. 8). The pilot signal detection and indication unit 200 is also structured to provide an indication to indicate the status and/or charging capacity associated with the detected pilot signal voltage and duty cycle.

The pilot signal detection and indication unit 200 includes a power supply 202, a bias voltage unit 204, a pilot voltage scaling unit 206, a pilot duty cycle comparator unit 208, a processing unit 210, and an indication unit 212. The power supply 202 is structured to generate a supply voltage. In some example embodiments of the disclosed concept, the power supply 202 is structured to generate the supply voltage from another higher voltage. For example, the power supply 202 may generate a 3.3V supply voltage from a 12V. The power supply 202 may generate other secondary voltages such as, without limitation a 4V secondary voltage. Various components of the pilot signal detection and indication unit 200 may use the supply voltage.

The bias voltage unit 204 is structured to generate a bias voltage. In some example embodiments of the disclosed concept, the bias voltage unit 204 uses the supply voltage to generate the bias voltage. For example, the bias voltage unit 204 may include a voltage divider that divides the supply voltage to generate the bias voltage. In some example embodiments, the supply voltage is 3.3V and the bias voltage unit 204 divides the supply voltage in half to generate a 1.65V bias voltage. However, it will be appreciated by those having ordinary skill in the art that the supply voltage may be divided by any amount without departing from the scope of the disclosed concept.

The pilot voltage scaling unit 206 is structured to generate a scaled pilot signal by shifting the pilot signal using the bias voltage and scaling down the pilot signal. In some example embodiments of the disclosed concept, the scaled pilot signal is linearly related to the voltage of the pilot signal. That is, a change in the voltage of the pilot signal will result in a proportional change in the voltage of the scaled pilot signal. In some example embodiments of the disclosed concept, the bias voltage is used to shift the pilot signal so that the resulting scaled pilot signal will not fall below 0V. For example, the bias voltage is used to shift the pilot signal such that the voltage of the scaled pilot signal is 0V when the voltage of the pilot signal is −12V. In some example embodiments of the disclosed concept, the pilot signal ranges from −12V to 12V and the scaled pilot signal is linearly related to the pilot signal and ranges from 0V to 3.3V. In some example embodiments of the disclosed concept, a maximum value of the scaled pilot signal is equal to the supply voltage. The range of voltages of the pilot signal can be difficult for a processor to handle while the scaled pilot signal, which has a lower peak voltage and is always a positive voltage, is easier for a processor to handle.

The pilot duty cycle comparator unit 208 is structured to generate a limited pilot signal that has a fixed peak voltage and a duty cycle that is equivalent to the duty cycle of the pilot signal. The fixed peak voltage means that the peak voltage of the limited pilot signal does not change. In some example embodiments of the disclosed concept, the fixed peak voltage is equal to the supply voltage. Also, in some example embodiments of the disclosed concept, the fixed peak voltage is equal to 3.3V. Higher voltages, such as a 9V pilot signal, can be difficult for a processor to handle. A limited pilot signal have a lower voltage such as, without limitation, 3.3V, is easier for a processor to handle.

The processing unit 210 is structured to receive the scaled pilot signal and the limited pilot signal. The processing unit 210 is also structured to determine a voltage of the pilot signal from the scaled pilot signal and a duty cycle of the pilot signal from the limited pilot signal. The processing unit 210 is structured to generate an indication signal based on the determined voltage and duty cycle of the pilot signal and to output the indication signal to the indication unit 212. In some example embodiments of the disclosed concept, predetermined indication signals may be each associated with selected pilot signal voltages and duty cycles. The processing unit 210 selects which indication signal corresponds to the detected pilot signal voltage and duty cycle and then generates the selected indication signal. For example, a table associating indication signals with pilot signal voltages and duty cycles may be stored in a memory in the processing unit 210.

As previously noted, the voltage and duty cycle of the pilot signal have associated statuses and charging capacities. In some example embodiments of the disclosed concept, the pilot signal voltages and duty cycles associated with a particular indication signal each correspond to a particular status and charging capacity of an electric vehicle charging system. In other words, each particular indication signal corresponds to a particular status and charging capacity.

The processing unit 201 may include a processor and an associated memory. The processor may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store one or more routines which, when executed by the processor, cause the processor to implement at least some of the functionality of the processing unit 210.

The indication unit 212 includes a number of indicators and is structured to activate selected ones of the indicators based on the indication signal. The indication unit 212 will provide different indications in response to different indication signals. For example and without limitation, one indication signal may cause the indication unit 212 to activate two indicators while another indication signal may cause the indication unit 212 to activate one indicator. Similarly, one indication signal may cause the indication unit 212 to activate one indicator while another indication signal may cause the indication unit 212 to activate a different indicator. In some example embodiments of the disclosed concept, a particular indication signal corresponds to a particular status and charging capacity of the electric vehicle charging system. The indication unit 212 will receive a particular indication signal for a particular status and charging capacity and will provide a particular response (e.g., activate a particular set of indicators) that corresponds to the particular status and charging capacity. A user can thus be provided an indication of the status and the charging capacity of the electric vehicle charging system via the indication provided by the indication unit 212.

Figure 3:
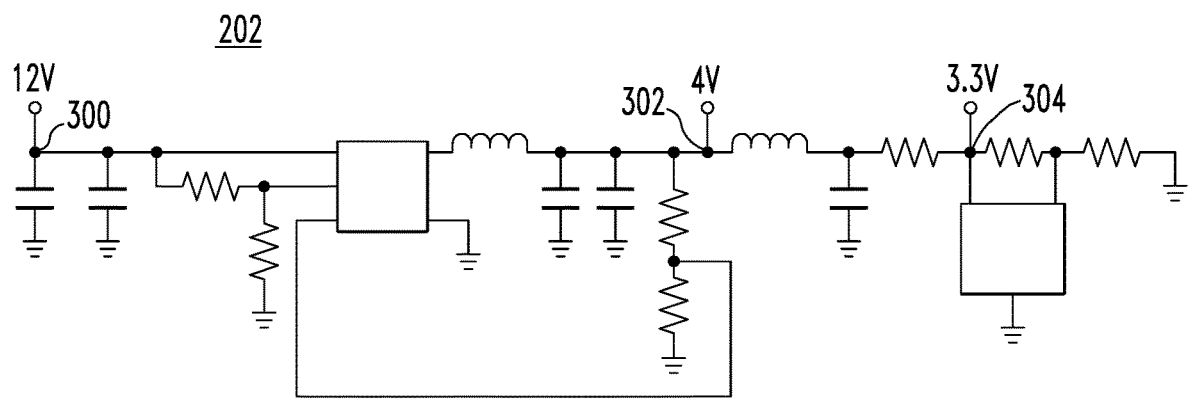
FIG. 3 is a circuit diagram of a power supply unit in accordance with an example embodiment of the disclosed concept.

FIG. 3 is a circuit diagram of the power supply unit 202 in accordance with an example embodiment of the disclosed concept. The power supply unit 202 receives a 12V voltage at point 300. The power supply unit 202 converts the 12V to a 4V secondary voltage which is output at point 302. The power supply 202 also converts the 12V, by further converting the 4V secondary voltage, to a 3.3V supply voltage. The power supply unit outputs the supply voltage at point 304. While FIG. 3 shows one arrangement of components for the power supply unit 202, it will be appreciated that the power supply unit 202 may include different components in different arrangements without departing from the scope of the disclosed concept.

Figure 4:
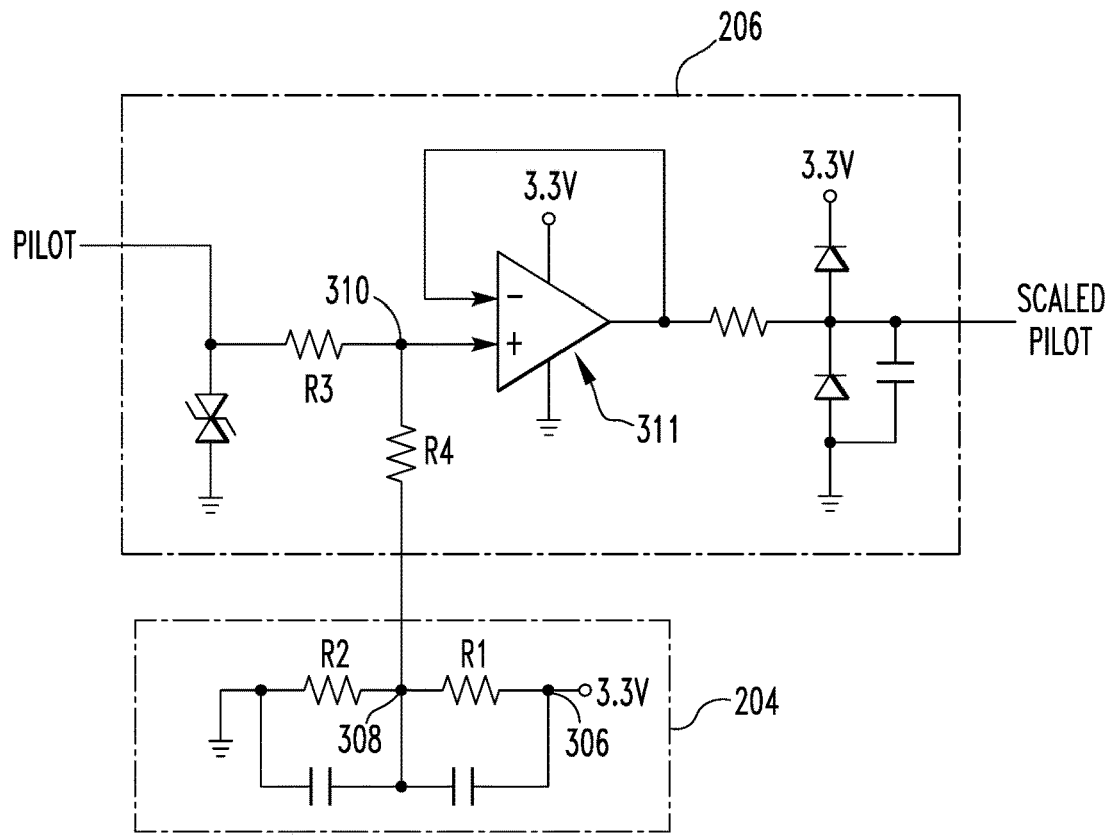
FIG. 4 is a circuit diagram of a bias voltage unit and a pilot signal scaling unit in accordance with an example embodiment of the disclosed concept.

FIG. 4 is a circuit diagram of the bias voltage unit 204 and the pilot signal voltage scaling unit 206 in accordance with an example embodiment of the disclosed concept. The bias voltage unit 204 receives the supply voltage of 3.3V at point 306. The bias voltage unit 204 includes two resistors R1 and R2 arranged as a voltage divider that divides the supply voltage and outputs the divided voltage at point 308. In some example embodiments of the disclosed concept, the resistors R1 and R2 have approximately equal values resulting in the bias voltage being approximately half the voltage of the supply voltage.

The pilot voltage scaling unit 206 includes two resistors R3 and R4 arranged as a voltage divider that divides a difference between the pilot signal voltage and the bias voltage. The voltage divider of the pilot voltage scaling unit 206 outputs the divided voltage at point 310 to a voltage follower circuit 311. The voltage follower circuit 311 outputs the scaled pilot signal which is provided to the processing unit 210. In some example embodiments of the disclosed concept, the values of the resistors R3 and R4 are selected such that the output voltage of the voltage divider of the pilot voltage scaling unit 206 is 3.3V when the voltage of the pilot signal is 12V.

Figure 5:
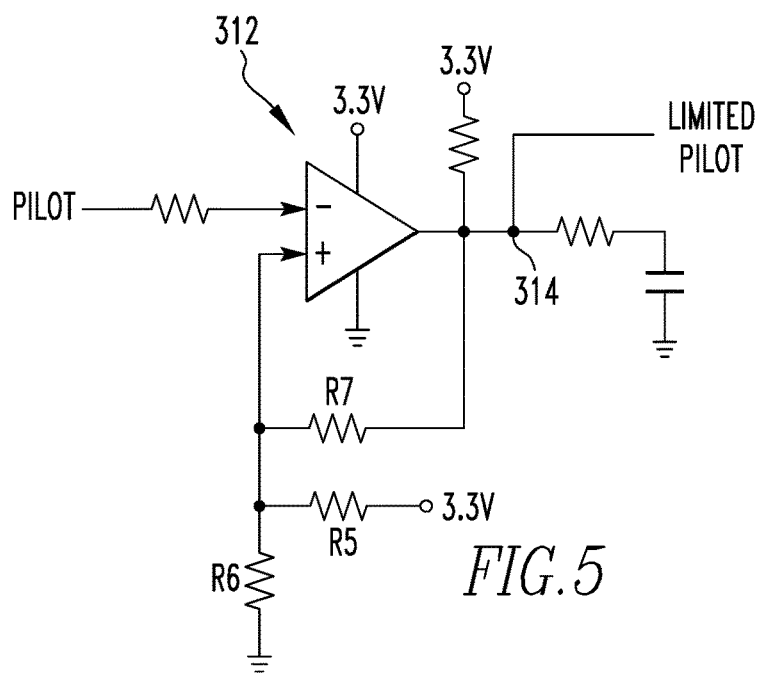
FIG. 5 is a circuit diagram of a pilot duty cycle comparator unit in accordance with an example embodiment of the disclosed concept.

FIG. 5 is a circuit diagram of the pilot signal duty cycle comparator unit 208 in accordance with an example embodiment of the disclosed concept. The pilot signal duty cycle comparator unit 208 includes a comparator circuit 312 that outputs a voltage equal to the supply voltage when the voltage of the pilot signal is greater than a threshold voltage and outputs 0V when the voltage of the pilot signal is less than a threshold voltage. In some example embodiments of the disclosed concept, the threshold voltage may be 2V. However, it will be appreciated by those having ordinary skill in the art that any threshold voltage may be used without departing from the scope of the disclosed concept. The threshold voltage may be generated by dividing the supply voltage using a voltage divider formed from resistors R5 and R6. In some example embodiments of the disclosed concept, the comparator circuit 312 may provide hysteresis. For example, resistor R7 may be used to provide hysteresis. The output of the comparator circuit 312 at point 314 is the limited pilot signal which is provided to the processing unit.

Figure 6:
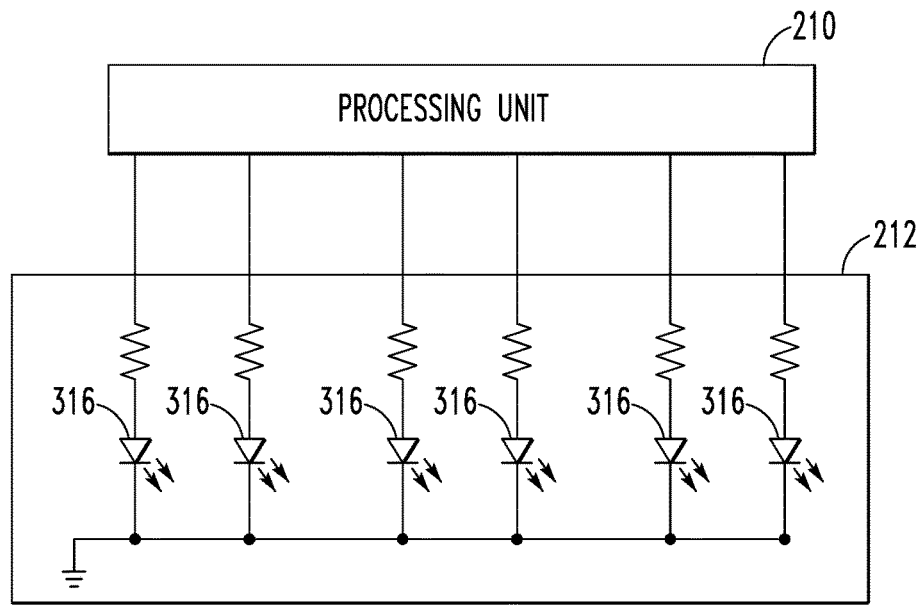
FIG. 6 is a circuit diagram of an indication unit in accordance with an example embodiment of the disclosed concept.

FIG. 6 is a circuit diagram of the indication unit 212 in accordance with an example embodiment of the disclosed concept. The indication unit 212 includes a number of indicators 316 such as, for example and without limitation, light emitting diodes (LEDs). The indication signal 212 is provided from the processing unit 210 to the indication unit 212 via various outputs of the processing unit 210. The processing unit 210 is thus able to cause selected ones of the indicators 316 to be activated in response to an indication signal. It will be appreciated by those having ordinary skill in the art that the indication signal may also be provided by a single output of the processing unit 210 without departing from the scope of the disclosed concept. For example and without limitation the indication signal may be multiplexed by the processing unit 210 and output through a signal output and then demultiplexed by the indication unit 212 to activate selected ones of the indicators 316.

In some example embodiments of the disclosed concept, one or more of the indicators 316 may have different colors. Additionally, in some example embodiments of the disclosed concept, activation of an indicator 316 may include causing the indicator 316 to output a particular pattern (e.g., blinking at a selected frequency). It will also be appreciated that different types of indicators 316 may be employed without departing from the scope of the disclosed concept.

Figure 7:
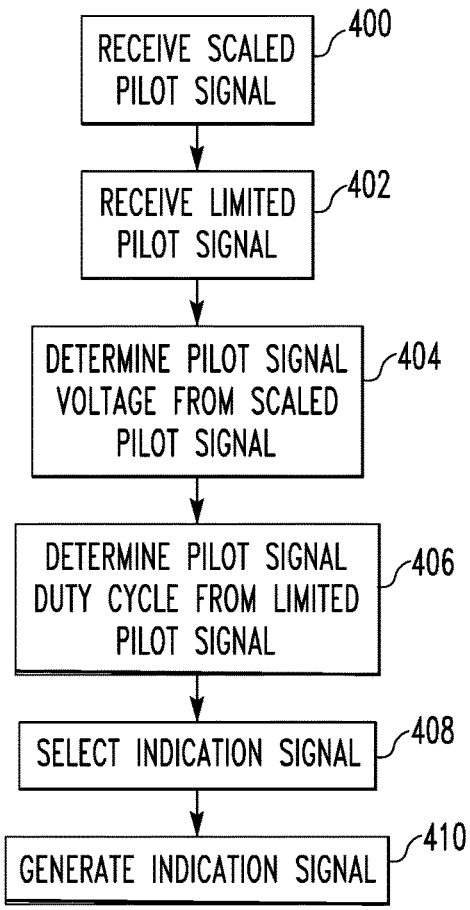
FIG. 7 is a flowchart of a method of indicating charging system status and charging capacity in accordance with an example embodiment of the disclosed concept.

FIG. 7 is a flowchart of a routine that may be implemented by the processing unit 210 in accordance with an example embodiment of the disclosed concept. The routine begins at 400 where the processing unit 210 receives the scaled pilot signal from the pilot voltage scaling unit 206. At 402, the processing unit 210 receives the limited voltage from the pilot duty cycle comparator unit 208.

At 404, the processing unit 210 determines the pilot signal voltage from the scaled pilot signal voltage. As previously noted, the pilot signal voltage and the scaled pilot signal voltage are linearly related. The processing unit 210 may use any suitable method to resolve the pilot signal voltage from the scaled pilot signal voltage. For example and without limitation, the processing unit 210 may reverse the shift and scaling of the pilot signal scaling unit 206 to determine the pilot signal voltage.

At 406, the processing unit 210 determines the pilot signal duty cycle from the limited pilot signal voltage. As previously noted, the limited pilot signal has the same duty cycle as the pilot signal. The processing unit 210 may use any suitable method to determine the duty cycle. For example and without limitation, the processing unit 210 may detect the duty cycle of the limited pilot signal which results in determining the duty cycle of the pilot signal since the two are the same.

At 408, the processing unit 210 selects the indication signal 408. Each indication signal may be associated with particular voltages and duty cycles of the pilot signal. The processing unit 210 may look up which indication signal corresponds to the determined voltage and duty cycle of the pilot signal and select that indication signal. In some example embodiments of the disclosed concept, the association between the indication signals and pilot signal voltage and duty cycles may be stored in a look-up table. At 410, the processing unit 210 generates the indication signal. In some example embodiments of the disclosed concept, generation of the indication signal includes generating voltages at selected outputs of the processing unit 210 corresponding to the particular indication signal. Generating the indication signal causes it to be output to the indication unit 212.

Figure 8:
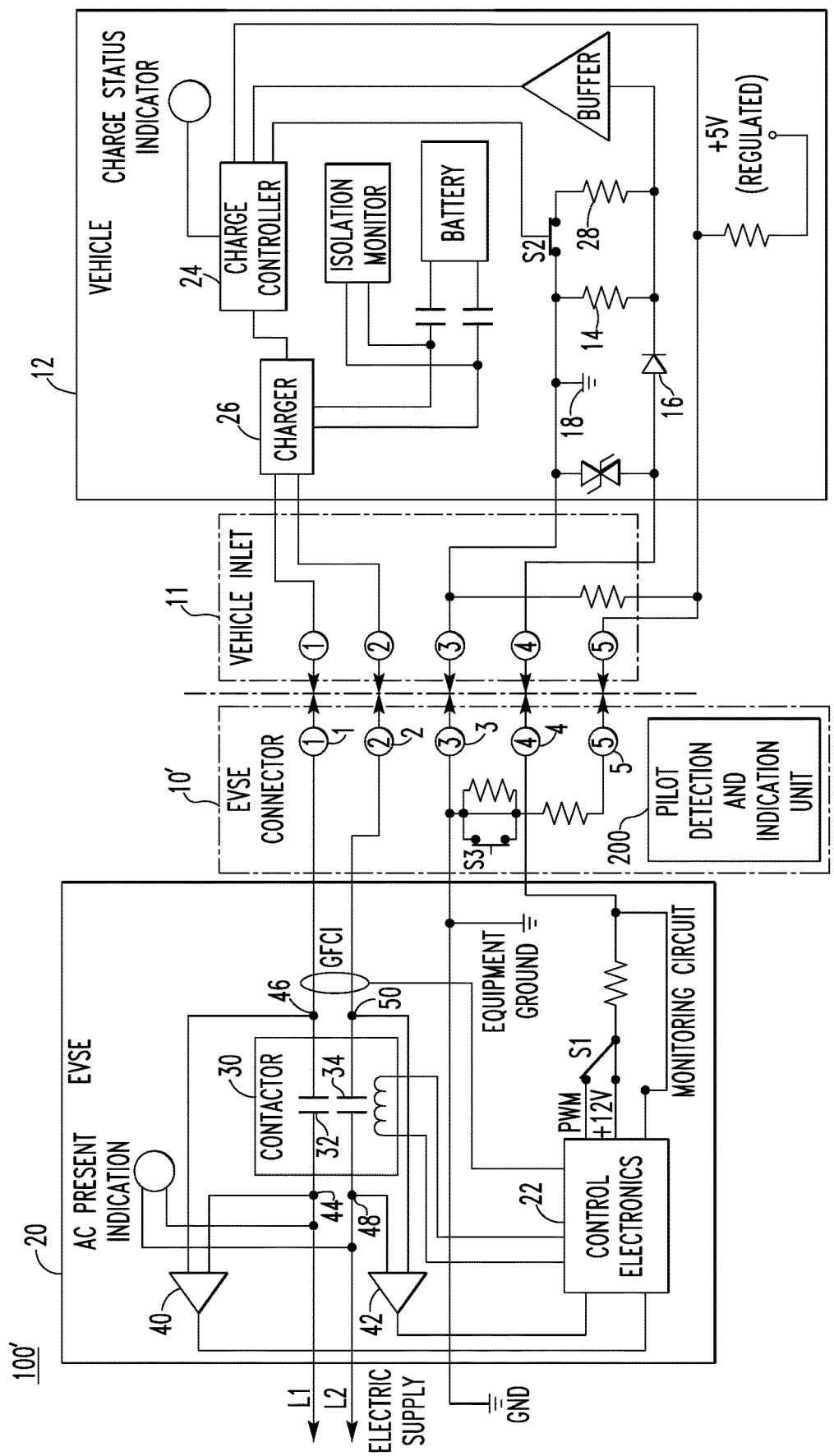
FIG. 8 is a block diagram in schematic form of an electric vehicle charging system in accordance with an example embodiment of the disclosed concept;.

FIG. 8 is a block diagram in schematic from of an electric vehicle charging system 100' including the pilot detection and indication unit 200 in accordance with an example embodiment of the disclosed concept. The charging system 100' is similar to the charging system 100 of FIG. 1. However, the charging system 100' includes the pilot detection and indication system 200 in accordance with example embodiments of the disclosed concept. The pilot detection and indication system 200 may be incorporated in the EVSE connector 10', as is shown in FIG. 8. However, it will be appreciated by those having ordinary skill in the art that the pilot detection and indication system 200 may be incorporated into other elements of the charging system 100' without departing from the scope of the disclosed concept. For example and without limitation, the pilot detection and indication system 200 may be incorporated into the EVSE 20 or the vehicle 12 without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A pilot signal detection unit for use with an electric vehicle charging system having a pilot signal with a voltage value and a duty cycle, the pilot signal detection and indication unit comprising:
    a pilot signal scaling unit structured to generate a scaled pilot signal by shifting the pilot signal and scaling down the pilot signal;
    a pilot signal duty cycle comparator unit structured to generate a limited pilot signal that has a fixed peak voltage and a duty cycle that is equivalent to the duty cycle of the pilot signal; and
    a processing unit structured to determine a voltage value and the duty cycle of the pilot signal from the scaled pilot signal and the limited pilot signal and to generate an indication signal based on the determined voltage value and duty cycle.

2. The pilot signal detection unit of claim 1, wherein a voltage value of the scaled pilot signal is linearly related to the voltage value of the pilot signal.

3. The pilot signal detection unit of claim 2, wherein the voltage value of the pilot signal has a range of −12V to 12V and the voltage value of the scaled pilot signal has a range of 0V to 3.3V.

4. The pilot signal detection unit of claim 1, wherein the pilot signal scaling unit is structured to shift the pilot signal such that the scaled pilot signal is greater than or equal to 0V when the pilot signal is −12V.

5. The pilot signal detection unit of claim 1, further comprising:
    a bias voltage unit structured to generate a bias voltage using a supply voltage, and
    wherein the pilot signal scaling unit is structured to shift the pilot signal using the bias voltage.

6. The pilot signal detection unit of claim 5, wherein a maximum voltage value of the scaled pilot signal and the fixed peak voltage of the limited pilot signal are equal to a voltage value of the supply voltage.

7. The pilot signal detection unit of claim 6, wherein the bias voltage unit is structured to generate a bias voltage whose voltage value is one half of the voltage value of the supply voltage.

8. The pilot signal detection unit of claim 5, wherein the bias voltage unit includes two resistors arranged as a voltage divider and is structured to divide the supply voltage to generate the bias voltage.

9. The pilot signal detection unit of claim 1, wherein the pilot signal scaling unit includes:
    two resistors arranged as a voltage divider to divide a difference in voltage between the pilot signal and the bias voltage; and
    a voltage follower circuit electrically connected to an output of the voltage divider.

10. The pilot signal detection unit of claim 9, wherein the voltage divider is structured such that when the voltage value of the pilot signal is 12V the output of the voltage divider is 3.3V.

11. The pilot signal detection unit of claim 1, wherein the pilot duty cycle comparator circuit is a comparator circuit structured to set the voltage value of the limited pilot signal to the fixed peak voltage when the voltage value of the pilot signal is greater than about 2V and to set the voltage value of the limited pilot signal to 0V when the voltage value of the pilot signal is less than about 2V.

12. The pilot signal detection unit of claim 11, wherein the fixed peak voltage value is 3.3V.

13. The pilot signal detection unit of claim 11, wherein the pilot duty cycle comparator circuit is structured to provide hysteresis.

14. The pilot signal detection unit of claim 1, wherein the indication signal is selected from a plurality of distinct indication signals by the processing unit based on the determined voltage value and duty cycle value.

15. The pilot signal detection unit of claim 14, wherein each of the plurality of distinct indication signals correspond to a particular status or charging capacity of the electric vehicle charging system.

16. The pilot signal detection unit of claim 1, further comprising:
    a power supply structured to receive a first voltage and to convert the first voltage to the supply voltage, wherein the supply voltage is less than the first voltage.

17. The pilot signal detection unit of claim 16, wherein the first voltage is 12V and the supply voltage is 3.3V.

18. The pilot signal detection unit of claim 1, further comprising:
    an indication unit having a number of indicators and being structured to activate selected ones of the number of indicators based on the indication signal.

19. An electric vehicle charging system comprising:
    an electric vehicle;
    electric vehicle supply equipment structured to provide power to charge the electric vehicle and to generate a pilot signal having a voltage value and a duty cycle value; and
    a connector structured to electrically connect the electric vehicle supply equipment to the electric vehicle, the connector including a pilot detection circuit comprising:
        a pilot signal scaling unit structured to generate a scaled pilot signal by shifting the pilot signal and scaling down the pilot signal;
        a pilot signal duty cycle comparator unit structured to generate a limited pilot signal that has a fixed peak voltage and a duty cycle that is equivalent to the duty cycle of the pilot signal; and
        a processing unit structured to determine a voltage value and the duty cycle of the pilot signal from the scaled pilot signal and the limited pilot signal and to generate an indication signal based on the determined voltage value and duty cycle.

20. The electric vehicle charging system of claim 19, wherein a voltage value of the scaled pilot signal is linearly related to the voltage value of the pilot signal.

21. The electric vehicle charging system of claim 19, wherein the indication signal is selected from a plurality of distinct indication signals by the processing unit based on the determined voltage value and duty cycle value, and
    wherein each of the plurality of distinct indication signals correspond to a particular status or charging capacity of the electric vehicle charging system.

* * * * *